(12) United States Patent  (10) Patent No.: US 7,327,878 B2
Nakabayashi et al.  (45) Date of Patent: Feb. 5, 2008

(54) IMAGE PICKUP APPARATUS

(75) Inventors: Kiyotaka Nakabayashi, Saitama (JP); Takahiro Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 10/937,473

(22) Filed: Sep. 9, 2004

(65) Prior Publication Data

US 2005/0052546 A1  Mar. 10, 2005

(30) Foreign Application Priority Data

Sep. 10, 2003 (JP) ............................ P2003-318192

(51) Int. Cl.
*G06K 9/00* (2006.01)
(52) U.S. Cl. .................... 382/167; 348/223.1
(58) Field of Classification Search ................ 382/162, 382/164, 165, 167, 190, 274; 348/223.1, 348/224.1, 225.1

See application file for complete search history.

(56) References Cited

U.S. PATENT DOCUMENTS 5,831,672 A * 11/1998 Takei ..................... 348/225.1

7,098,944 B1 * 8/2006 Shiraiwa et al. ......... 348/222.1

* cited by examiner

*Primary Examiner*—Phuoc Tran
(74) *Attorney, Agent, or Firm*—Frommer Lawrence & Haug LLP; William S. Frommer

(57) ABSTRACT

In an image pickup apparatus, a particular color signal is extracted from an input video signal based on the selected image taking mode information, white balance control amount calculating means calculates a control amount based on the extracted video signal of the particular color, the white balance correcting means corrects the white balance of the video signal according to this control amount, and then the color correcting means corrects the particular color signal in the video signal based on color correction parameter values set in advance. Subsequently, low chroma color suppression processing means corrects the gain amount of the video signal corresponding to the predetermined area centered at the origin in the color difference plane, from among the video signal corrected by the color correcting means, thereby correcting the particular color in the video signal and also correcting white balance deviated due to the correction of the particular color.

9 Claims, 11 Drawing Sheets

PARTICULAR COLOR A

PARTICULAR COLOR B

PARTICULAR COLOR C

PARTICULAR COLOR A

PARTICULAR COLOR A s : DIRECT DISTANCE FROM ORIGIN
(b-y) : DISTANCE FROM ORIGIN IN COLOR DIFFERENCE [B-Y] DIRECTION
(r-y) : DISTANCE FROM ORIGIN IN COLOR DIFFERENCE [R-Y] DIRECTION

Gain(s, γ) : GAIN AMOUNT (CORRECTION AMOUNT)
s : DIRECT DISTANCE FROM ORIGIN
γ : CONVERGENCE COEFFICIENT

| Gain B | Hue R |
|--------|-------|
| Hue B  | Gain R |

| 1.5  | 0.0 |
|------|-----|
| -0.5 | 1.0 |

$$\begin{bmatrix} [B-Y]'' \\ [R-Y]'' \end{bmatrix} = \begin{bmatrix} \text{Gain B} & \text{Hue R} \\ \text{Hue B} & \text{Gain R} \end{bmatrix} \begin{bmatrix} [B-Y] \\ [R-Y] \end{bmatrix}$$

↓        ↓        ↓

CORRECTED COLOR DIFFERENCE SIGNALS    COLOR CORRECTION VALUES (COLOR CORRECTION MATRIX)    COLOR DIFFERENCE SIGNALS

IMAGE PICKUP APPARATUS

BACKGROUND OF THE INVENTION

1. Field of the Invention

The present invention relates to an image pickup apparatus, and more specifically, to an image pickup apparatus such as a digital still camera or a video camera which is able to correct a color signal of a particular color in a video signal.

2. Description of the Related Art

There is an apparatus such as a digital camera capable of automatically performing various settings such as focus and white balance and correcting a color signal of a particular color in a video signal into a predetermined color appropriate for a scene where an image is to be taken, by selecting an image taking mode according to the scene where an image is to be taken (for example, a sea, a night view, a portrait and a landscape).

In addition, as to this apparatus capable of correcting a particular color in a video signal, an image processing device or the like has been invented wherein the this apparatus corrects a particular color into a suitable color which humans latently memorize and feel to be the most beautiful, i.e., a color in human's memory. (For example, refer to Patent Document 1: Japanese Laid-Open Patent JPA-2001-292390).

In this apparatus, for example, when taking an image of a landscape containing a blue sky, the blue color (particular color) of the actually taken image is corrected in to a blue color in human's imagination (blue color in human's memory), because more vivid blue color is usually imagined than an actually viewing color of the blue sky, thereby reproducing the image in a color which agrees with the intention of the photographer (such as a color in human's memory).

An outline of the color correction processing operation of correcting a particular color in the video signal of a taken image will be described below.

FIG. 11 is one example of a block diagram showing a schematic construction of essential units for performing color signal correction processing in a conventional image pickup apparatus, and in which an image pickup apparatus 100A is provided with an image pickup lens unit 101A, an image pickup element 102A, a S/H (Sample & Hold) circuit 103A, an AGC (Automatic Grain Control) circuit 104A, an A/D (Analog to Digital) conversion circuit 105A, a particular color signal extraction circuit 106A, a WB (White Balance) circuit 107A, a gamma correction circuit 108A, a signal processing circuit 109A, a color difference signal correction circuit 110A, an image taking mode selection circuit 120A, a color correction value setting circuit 130A, and the like.

An outline of the operation of color correction processing in the image pickup apparatus 100A having this construction will be described below with reference to the flowchart of FIG. 12.

First, when a photographer selects a desired image taking mode (for example, a sea, a night view, a portrait or a landscape) via the image taking mode selection circuit 120A, predetermined units of the apparatus automatically perform various settings such as focus and white balance according to the image taking mode selected by the image taking mode selection circuit 120A in step ST10.

Table data of color correction values for correcting particular colors are set in the color correction value setting circuit 130A, and the color correction value setting circuit 130A selects a color correction value for a corresponding particular color from among these table data according to the selected image taking mode, and sets the selected color correction value in the color difference signal correction circuit 110A in step ST11 and ST12.

When the image taking is started, light from an object which is inputted into the image pickup lens unit 101A is converted to electrical signals by the image pickup element 102A, and thus obtained electrical signals are converted to digital video signals R[red], G[green], and B[blue] by the A/D conversion circuit 105A through the S/H circuit 103A and the AGC circuit 104A.

The particular color signal extraction circuit 106A extracts a video signal of a particular color from the digital video signal transmitted from the A/D conversion circuit 105A, and calculates a control amount for white balance appropriate for the extracted video signal of the particular color and transmits the control amount to the WB (White Balance) circuit 107A in step ST13.

The WB (White Balance) circuit 107A determines the color temperature of the video signals R[red], G[green], and B[blue] transmitted from the A/D conversion circuit 105A, and corrects the white balance of the video signals R[red], G[green], and B[blue] on the basis of the control amount for the white balance transmitted from the particular color signal extraction circuit 106A, and transmits the corrected video signals R[red], G[green], and B[blue] to the gamma correction circuit 108A. The gamma correction circuit 108A corrects the gray scale of this video signals and transmits the obtained video signals to the signal processing circuit 109A in step ST14 and ST15.

The signal processing circuit 109A converts the digital video signals R[red], G[green], and B[blue] transmitted from the gamma correction circuit 108A to a luminance signal Y and a color difference signal [B-Y] and a color difference signal [R-Y], and outputs the luminance signal Y and also transmits the converted color difference signal [B-Y] and the color difference signal [R-Y] to the color difference signal correction circuit 110A in step ST16.

The color difference signal correction circuit 110A corrects, on the basis of the color correction value which is set by the color correction value setting circuit 130A, a particular color of the color difference signal [B-Y] and the color difference signal [R-Y] transmitted from the signal processing circuit 109A into a predetermined color (such as a color in memory), and transmits the color-corrected color difference signals [B-Y]" and color difference signal [R-Y]" to the next-stage circuit in step ST17 and ST18.

The case where a particular color α is color-corrected into a predetermined color α1 by the operation of this color correction processing will be described below by way of example.

When one of image taking modes is selected by the image taking mode selection circuit 120A, the color correction value setting circuit 130A selects from the table data a color correction value for correcting the particular color α corresponding to the selected image taking mode, and sets the selected color correction value in the color difference signal correction circuit 110A.

Specifically, as shown in FIG. 13A, the color correction value is given as a color correction matrix made of parameter values (coefficient values) which are precisely amounts Gain B and Gain R of correction in a direction of gain relative to the particular color and amounts Hue B and Hue R of correction in a direction of hue relative to the same.

For example, if the color correction value is given as parameter values which are precisely the amounts Gain B→"1.5" and Gain R→"1.0" of correction in the direction of gain relative to the particular color and the amounts Hue B→"−0.5" and Hue R→"0.0" of correction in the direction of hue relative to the same, the color correction value (color correction matrix) as shown in FIG. 13B is obtained.

These color correction values are set in the color difference signal correction circuit 110A, and as shown in FIG. 13C, the color correction processing is performed by linearly converting the color difference signal [B-Y] and the color difference signal [R-Y] transmitted from the signal processing circuit 109A by using the color correction values (in a color correction matrix).

For example, in a color difference plane graph as shown in FIG. 13D, the color difference signals [B-Y]" and the color difference signal [R-Y]" in which the particular color α (b, r) contained in the color difference signal [B-Y] and the color difference signal [R-Y] is converted to the predetermined color α1 (b", r").

In this manner, a particular color of a video signal is color-corrected into a predetermined color according to the selected image taking mode, thereby being used to reproduce an image with a color which agrees with the intention of the photographer (such as a color in human's memory).

However, the conventional image pickup apparatus has the problem that when one of image taking modes is selected, since a color correction value (color correction amount) for correcting a particular color is fixedly selected and set, the particular colors are not necessarily corrected into preferable colors on occasion under any image taking situations or with respect to any taken images.

To cope with this problem, as an improvement measure, the present applicant has filed an patent application (Japanese Patent Application No. 2003-88060) for an image pickup apparatus which extracts a video signal of a particular color from a video signal on the basis of an image taking mode information, detects color difference data on the particular color from the extracted video signal of the particular color, selects correction reference data on a corresponding particular color from correction reference data storage means on the basis of the image taking mode information, calculates a color correction value for correcting the corresponding particular color into a predetermined color on the basis of the selected correction reference data and the color difference data on the particular color detected by color detecting means, and corrects the particular color of the video signal into the predetermined color on the basis of the calculated color correction value.

Similarly, the present applicant has filed an patent application (Japanese Patent Application No. 2003-90611) for an image pickup apparatus which is provided with color convergence parameter storage means which stores color convergence parameter values containing: position data indicating the position of a predetermined color on a color difference plane; correction area setting data for setting as a correction area a predetermined area centered at the position of the predetermined color; and convergence coefficient data for converging a particular color corresponding to the correction area to a position indicative of the predetermined color, and which, on the basis of selected image taking mode information, selects and sets a color convergence parameter value of the corresponding particular color from the color convergence parameter storing means, and converges a particular color in a video signal to a position indicative of a predetermined color on a color difference plane by using a correction amount calculated on the basis of the set color convergence parameter value, thereby effecting color correction.

SUMMARY OF THE INVENTION

The above-mentioned related-art image pickup apparatus and the image pickup apparatus of the above mentioned Japanese Patent Application No. 2003-88060 filed by the present applicant have the problem that the amount of calculation of parameter values for calculating a color correction value is large and takes time, so the load of such calculation processing becomes larger.

The image pickup apparatus of the above mentioned Japanese Patent Application No. 2003-90611 filed by the present applicant has the problem that the colors of the respective quadrants (four quadrants) in the color difference plane graph (two-dimensional coordinates which are represented by a vertical axis indicative of a color difference [R-G] and a horizontal axis indicative of a color difference [B-G]) need to be corrected and color convergence circuits corresponding to the respective quadrants (four quadrants) must be individually provided, so the circuit construction becomes complicated and costly.

Accordingly, a problem to be solved is to simplify a circuit construction so that the load of the calculation processing can be decreased in an image pickup apparatus that is able to correct a particular color in a video signal.

To solve the problem, the image pickup apparatus according to the present invention is constructed as follows.

An image pickup apparatus of the present invention includes image taking mode selecting means for selecting desired image taking mode information containing information on particular colors determined according to predetermined image taking conditions, particular color signal extracting means for extracting a video signal of the particular color from an input video signal on the basis of the image taking mode information selected by the image taking mode selecting means, white balance control amount calculating means for calculating a control amount for controlling the white balance of the input video signal on the basis of the video signal of the particular color extracted by the particular color signal extracting means, white balance correcting means for correcting the white balance of the input video signal according to the control amount calculated by the white balance control amount calculating means, color correcting means for correcting the particular color of the video signal corrected by the white balance correcting means into a predetermined color based on a color correction parameter value set for correcting the video signal of the particular color, and low chroma color suppression processing means for correcting a gain amount of a video signal corresponding to a predetermined area centered at the origin in a color difference plane in the video signal corrected by the color correcting means.

The image pickup apparatus of the present invention as cited above is characterized in that when the color correcting means corrects the particular color of the video signal into the predetermined color, the color correcting means corrects the particular color into a color corresponding to the position of an intersection of the outmost periphery of the area indicating the predetermined color and a straight line which is connecting a position indicating a corresponding particular color and a central position in an area indicating the predetermined color in the color difference plane.

The image pickup apparatus of the present invention as cited above is characterized in that the color correcting means is provided with a function which changes the color correction parameter value.

The image pickup apparatus of the present invention as cited above is characterized in that the image taking mode selecting means is provided with a function which automatically selects the image taking mode information according to image taking environments.

An image pickup apparatus of the present invention includes image taking mode selecting means for selecting desired image taking mode information containing information on particular colors determined according to predetermined image taking conditions, particular color signal extracting means for extracting a video signal of the particular color from an input video signal on the basis of the image taking mode information selected by the image taking mode selecting means, white balance control amount calculating means for calculating a control amount for controlling the white balance of the input video signal, on the basis of the video signal of the particular color extracted by the particular color signal extracting means, white balance correcting means for correcting the white balance of the input video signal according to the control amount calculated by the white balance control amount calculating means, color correcting means for correcting the particular color of the video signal corrected by the white balance correcting means into a predetermined color, on the basis of a color correction parameter value which is set for correcting the video signal of the particular color, low chroma color suppression processing means for correcting a gain amount of a video signal corresponding to a predetermined area centered at the origin in a color difference plane, in the video signal corrected by the color correcting means, and luminance correcting means for correcting a luminance level of the video signal, on the basis of the image taking mode information selected by the image taking mode selecting means.

The image pickup apparatus of the present invention as cited above is characterized in that the luminance correcting means is provided with a function for calculating the proportion of the video signal of the particular color in the video signal and for correcting the luminance level of the video signal of the particular color according to the calculated proportion.

The image pickup apparatus of the present invention as cited above is characterized in that when the color correcting means corrects the particular color of the video signal into the predetermined color, the color correcting means corrects the particular color into a color corresponding to the position of an intersection of a straight line and the outmost periphery of the area indicating the predetermined color and a straight line which is connecting a position indicating a corresponding particular color and a central position in an area indicating the predetermined color in the color difference plane.

The image pickup apparatus of the present invention as cited above is characterized in that the color correcting means is provided with a function for changing the color correction parameter value.

The image pickup apparatus of the present invention as cited above is characterized in that the image taking mode selecting means is provided with a function for automatically selecting the image taking mode information according to image taking environments.

In the image pickup apparatus having this construction, the video signal of the particular color is extracted from the input video signal by the particular color signal extracting means on the basis of the image taking mode information selected by the image taking mode selecting means, then the white balance control amount calculating means calculates the control amount for controlling the white balance of the input video signal on the basis of the extracted video signal of the particular color, then the white balance correcting means corrects the white balance of the video signal according to this control amount, and then the color correcting means corrects the particular color signal in the video signal on the basis of the color correction parameter values which are set in advance.

Subsequently, the low chroma color suppression processing means corrects the gain amount of the video signal corresponding to the predetermined area centered at the origin in the color difference plane, in the video signal color-corrected by the color correcting means, thereby correcting the particular color in the video signal and also correcting white balance deviated due to the correction of the particular color.

In the image pickup apparatus of the present invention, a predetermined area centered at the origin in a color difference plane in a video signal corrected for a particular color, i.e., only a color corresponding to a predetermine area associated with white balance, is corrected by the low chroma color suppression processing means, whereby it is possible to obtain a video signal which is corrected for the particular color and is appropriately corrected for white balance, without correcting all other colors deviated due to the correction of the particular color.

Accordingly, since color convergence circuits for correcting the respective quadrants (four quadrants) of the color difference plane need not be individually provided, the circuit construction can be simplified and can be reduced in cost. In addition, since only the predetermined area centered at the origin in the color difference plane is corrected, it is possible to achieve the superior advantage of decreasing the load of calculation processing.

DESCRIPTION OF THE PREFERRED EMBODIMENTS

Embodiments of an image pickup apparatus according to the present invention will be described below with reference to the accompanying drawings. However, the drawings are referred to by way of illustration only, and are not intended to restrict the technical scope of the invention.

Figure 1:
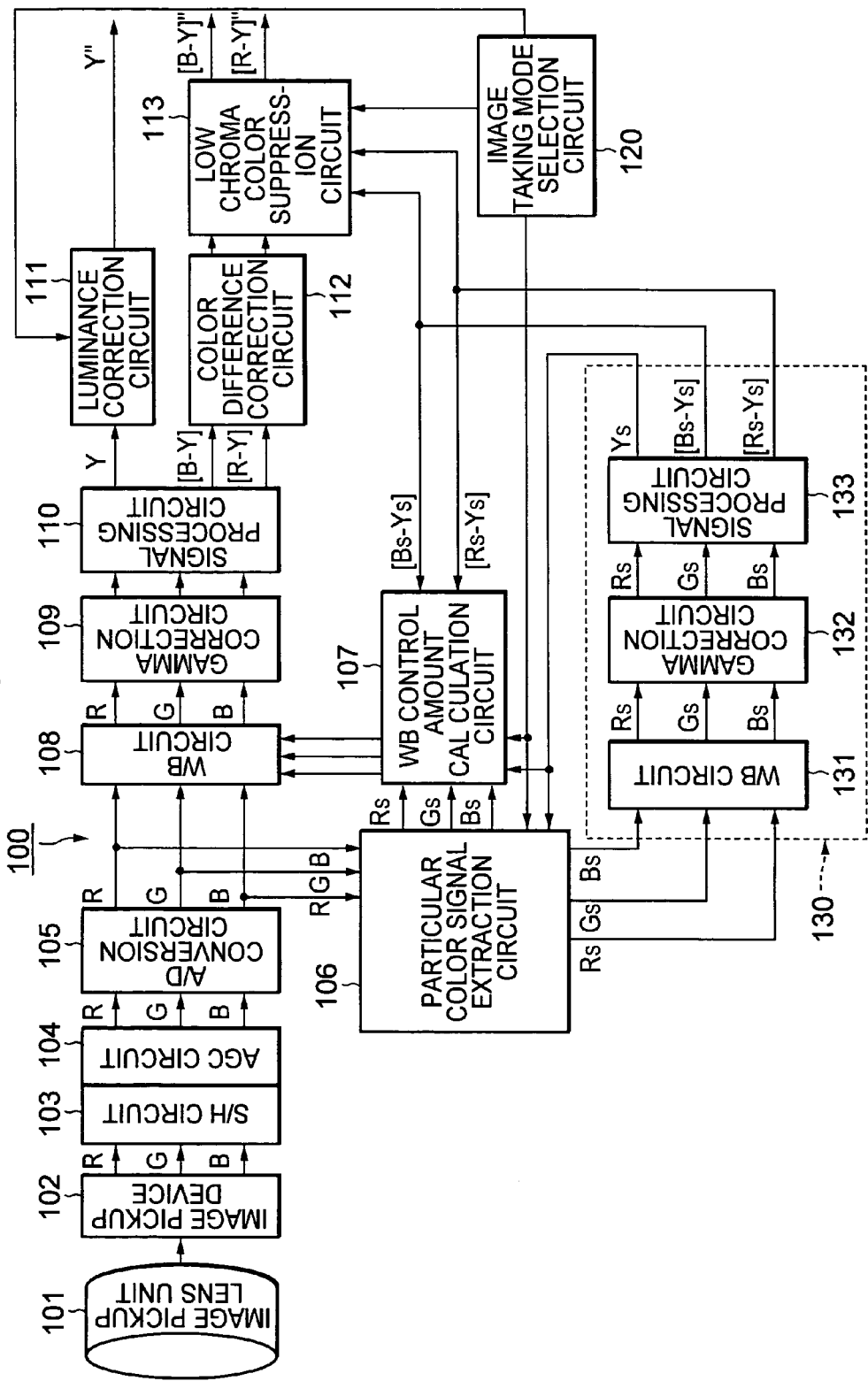
FIG. 1 is a block diagram showing a schematic construction of essential units for performing color signal correction processing in an image pickup apparatus according to the present invention.

FIG. 1 is a block diagram showing a schematic construction of essential units for performing color signal correction processing in the image pickup apparatus, and the schematic construction is provided with an image pickup lens unit 101, an image pickup device 102, a S/H (Sample & Hold) circuit 103, an AGC (Automatic Grain Control) circuit 104, an A/D (Analog to Digital) conversion circuit 105, a particular color signal extraction circuit 106, a WB (White Balance) control amount calculation circuit 107, a WB (White Balance) circuit 108, a gamma correction circuit 109, a signal processing circuit 110, a luminance correction circuit 111, a color difference correction circuit 112, a low chroma color suppression circuit 113, an image taking mode selection circuit 120, a particular color signal processing unit 130, and the like.

The image pickup lens unit 101 receives light from an object and transmits the light to the image pickup element 102.

A plurality of pixels which convert incoming light to electrical signals (for example, a CCD (Charge Coupled Device)) are arrayed in the image pickup device 102, and the light from the object which passes through the image pickup lens unit 101 is converted to electrical signals by the individual pixels and the image pickup device 102 transmits the electrical signals of an analog video signal to the S/H (Sample & Hold) circuit 103.

The S/H circuit 103 samples the analog video signal sent from the image pickup element 102 and transmits sampled values to the AGC circuit 104, and holds the sampled values until the processing of the A/D conversion circuit 105 comes to an end. When this processing comes to an end, the S/H circuit 103 transmits the next sampled values to the AGC circuit 104.

The AGC circuit 104 amplifies the analog video signal sampled by the S/H circuit 103, and transmits the amplified analog video signal to the A/D conversion circuit 105.

The A/D conversion circuit 105 converts the analog video signal amplified by the AGC circuit 104 to digital video signals R[red], G[green], and B[blue] and transmits the digital video signals to the particular color signal extraction circuit 106 and the WB circuit 108.

The particular color signal extraction circuit 106 extracts, on the basis of image taking mode information from the image taking mode selection circuit 120 which will be described later as well as according to a luminance signal Ys from a signal processing circuit 133 of the particular color signal processing unit 130, a particular color video signal to be subjected to color correction (hereinafter referred to as particular color signal (Rs[red], Gs[green], and Bs[blue]) from the digital video signals R[red], G[green], and B[blue] transmitted from the A/D conversion circuit 105, and transmits the extracted particular color signal to the WB control amount calculation circuit 107 and a WB circuit 131 of the particular color signal processing unit 130.

Figure 2:
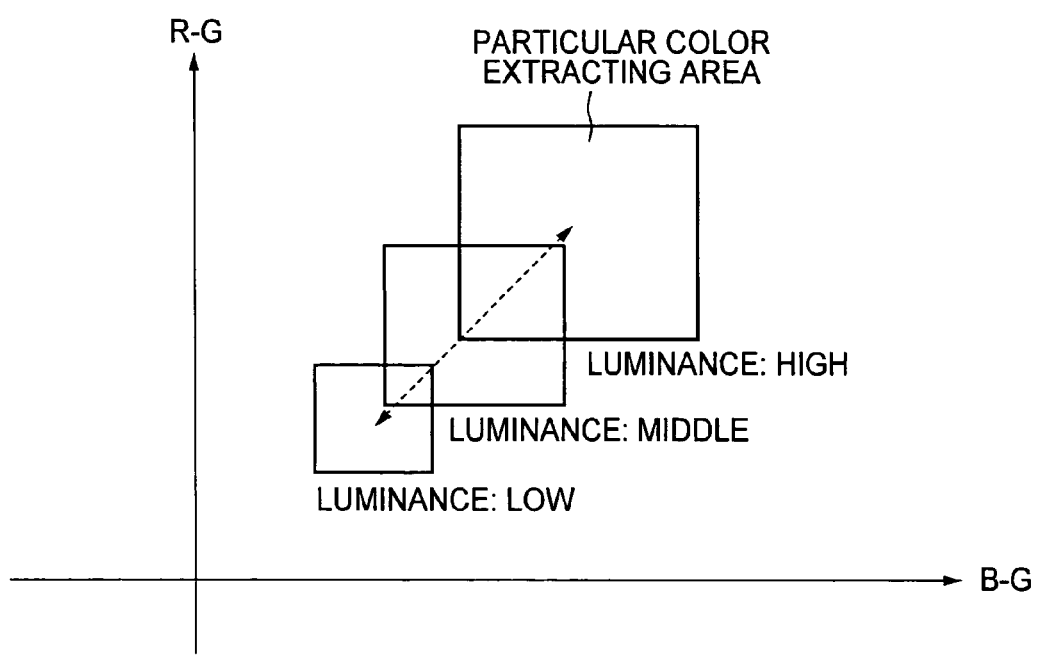
FIG. 2 is an explanatory view schematically showing the manner in which a particular color extracting area is varied according to the luminance level of a video signal, in the image pickup apparatus of FIG. 1.

When the particular color video signal is to be extracted, the particular color signal extraction circuit 106 changes, as shown in FIG. 2, a particular color extracting range in a color difference plane graph (two-dimensional coordinates which are represented by a vertical axis indicative of a color difference signal [R-G] and a horizontal axis indicative of a color difference signal [B-G]), and performs detection of the particular color video signal.

The WB (White Balance) control amount calculation circuit 107 calculates, on the basis of the image taking mode information from the image taking mode selection circuit 120 (to be described later), a control amount for white balance (hereinafter referred to as a white balance control amount) which corresponds to the particular color signal (Rs[red], Gs[green], and Bs[blue]) from the particular color signal extraction circuit 106 and the luminance signal Ys and color difference signals [Bs-Ys] and [Rs-Ys] from the signal processing circuit 133 of the particular color signal processing unit 130 which will be described later, and transmits the calculated white balance control amount to the WB circuit 108.

The WB (White Balance) circuit 108 corrects the white balance of the video signal (R[red], G[green], and B[blue]) transmitted from the A/D conversion circuit 105, in accordance with the white balance control amount calculated by the WB control amount calculation circuit 107, and transmits the corrected white balance corrected video signal to the gamma correction circuit 109.

The gamma correction circuit 109 corrects the gray scale of the video signals (R[red], G[green], and B[blue]) transmitted from the WB circuit 108, i.e., performs a so-called gamma correction, and transmits the gamma corrected video signal to the signal processing circuit 110.

The signal processing circuit 110 converts the video signal (R[red], G[green], and B[blue]) transmitted from the gamma correction circuit 109 into a luminance signal Y and color difference signals [B-Y] and [R-Y]. Then, the signal processing circuit 110 transmits the converted luminance signal Y to the luminance correction circuit 111 and also transmits the converted color difference signals [B-Y] and [R-Y] to the color difference correction circuit 112.

The luminance correction circuit 111 corrects the luminance level of the luminance signal Y transmitted from the signal processing circuit 110, on the basis of the image pickup mode information from the image taking mode selection circuit 120, and transmits a corrected luminance signal Y" to the next-stage circuit.

The luminance correction circuit 111 also calculates the proportion of the particular color in the entire video signal (the entire image frame) of the taken image, and corrects the luminance level of the particular color in the luminance signal Y according to the calculated proportion.

Color correction parameter values for color-correcting, into predetermined colors such as memory colors, particular colors to be subjected to the determined color correction according to image taking modes are set in the color difference correction circuit 112, and the color difference correction circuit 112 performs the processing of correcting the particular color of the color difference signals [B-Y] and [R-Y] transmitted from the signal processing circuit 110 into a particular color (such as a color in a memory), on the basis of these color correction parameter values, and transmits the corrected particular color signal to the low chroma color suppression circuit 113.

In addition, the color difference correction circuit 112 is able to change the color correction parameter values for color correction of particular colors according to a selected image taking mode information in the image taking mode selection circuit 120 which will be described later. For example, in the case of an apparatus capable of acquiring data from a recording medium such as a memory card, the color difference correction circuit 112 can read other color correction parameter values from the recording medium (such as a memory card) and changes the color correction parameter values for the other ones, and in the case of an apparatus connectable to a communication network, the color difference correction circuit 112 can change the color correction parameter values for color correction parameter values acquired via the communication network.

The low chroma color suppression circuit 113 performs low chroma color suppression control according to the color difference signals [Bs-Ys] and [Rs-Ys] from the signal processing circuit 133 of the particular color signal processing unit 130 which will be described later, on the basis of the image taking mode information from the image taking mode selection circuit 120 (it is described later), and transmits, to the next-stage circuit, color difference signals [B-Y]" and [R-Y]" obtained by correcting the gain amount, among of the color difference signals [B-Y] and [R-Y] transmitted from the color difference correction circuit 112, of color difference signals [B-Y] and [R-Y] which match to a pre-determine area centered at the origin in a color difference plane (hereinafter referred to as a WB area).

The image taking mode selection circuit 120 has a plurality of image taking modes which are set in advance according to image taking conditions, scenes and the like (such as a sea, a night view, a portrait and a landscape), and is able to select a desired image taking mode.

When one of image taking modes is selected, the image taking mode selection circuit 120 transmits image taking mode information corresponding to the selected image taking mode to predetermined units, such as the particular color signal extraction circuit 106, the WB control amount calculation circuit 107, the luminance correction circuit 111, and the low chroma color suppression circuit 113 inside the apparatus.

The image taking mode information contains information such as information on a particular color to be subjected to color correction determined according to the image taking mode and the information necessary to automatically perform various settings such as a focus and a white balance.

Incidentally, the image taking mode selection circuit 120 can be adapted to automatically select an appropriate image taking mode according to image taking environments such as ambient brightness and the state of a light source, and can also be adapted to effect switching between automatic selection and manual selection.

In addition, the image taking mode information can be changed, and for example, in the case of an apparatus capable of acquiring data from a recording medium such as a memory card, the image taking mode selection circuit 120 can change it after reading the other image taking mode information recorded on the recording medium (such as a memory card), and in the case of an apparatus connectable to a communication network, the image taking mode selection circuit 120 can change it for image taking mode information acquired via the communication network, whereby the image taking mode information can be changed for image taking mode information which provides a color or a hue corresponding to the taste of each user, or can also be customized for each user.

The particular color signal processing unit 130 is made of the WB (White Balance) circuit 131, a gamma correction circuit 132, the signal processing circuit 133 and the like.

The WB circuit 131 of the particular color signal processing unit 130 corrects the white balance of the particular color signal (Rs[red], Gs[green], and Bs[blue]) extracted by the particular color signal extraction circuit 106, and transmits it to the gamma correction circuit 132.

The gamma correction circuit 132 of the particular color signal processing unit 130 corrects the gray scale of the particular color signal (Rs[red], Gs[green], and Bs[blue]) transmitted from the WB circuit 131, i.e., performs a so-called gamma correction, and transmits the gamma corrected video signal to the signal processing circuit 133.

The signal processing circuit 133 of the particular color signal processing unit 130 converts the particular color signal (Rs[red], Gs[green], and Bs[blue]) gamma corrected by the gamma correction circuit 132 into the luminance signal Ys and the color difference signals [Bs-Ys] and [Rs-31 Ys], and transmits the converted luminance signal Ys to the particular color signal extraction circuit 106 and the WB control amount calculation circuit 107, and also transmits the converted color difference signals [Bs-Ys] and [Rs-Ys] to the WB control amount calculation circuit 107 and the low chroma color suppression circuit 113.

An outline of color correction processing by an image pickup apparatus 100 having the above-mentioned construction will be described below.

Figure 3A:
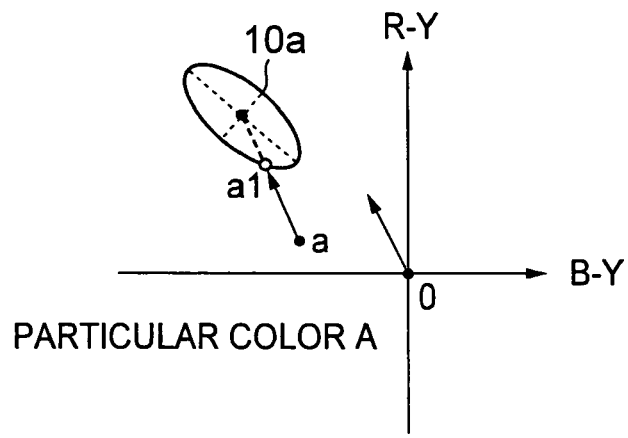
FIGS. 3A to 3C are explanatory views showing by way of example the manner of color correction processing in the image pickup apparatus of FIG. 1.
Figure 3B:
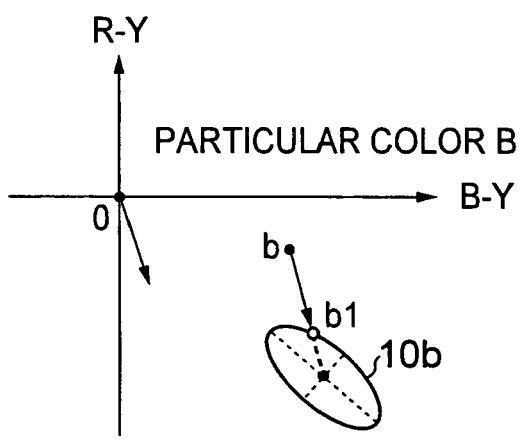
Figure 3C:
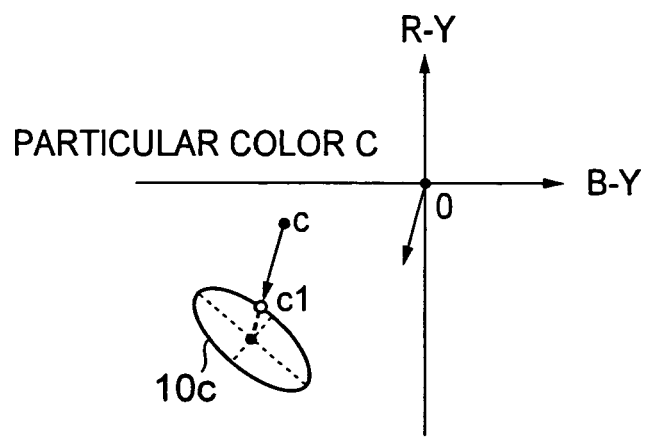

FIGS. 3A to 3C are views showing the manner of the color correction processing, and areas 10a, 10b and 10c respectively denote areas in which particular colors A, B and C exist in a color difference plane graph (of two-dimensional coordinates which are represented by a vertical axis indicative of the color difference signal [R-Y] and a horizontal axis indicative of the color difference signal [B-Y]). Incidentally, this color difference plane graph is based on the state in which the white balance correction function of the apparatus is ON.

For example, in the color difference plane graph of FIG. 3A, if the color difference signals of a color corresponding to a position a are to be color-corrected toward the particular color A, the central position of the area 10a and the position a are connected by a straight line to find a position a1 which is a position intersecting with the outermost periphery of the area 10a, and a correction amount corresponding to the distance from the position a to the position a1 is calculated and the color difference signals are corrected on the basis of the calculated correction amount.

However, if the color correction processing of the particular color is performed on the basis of this correction amount, colors in other quadrants of the color difference plane graph will be influenced.

For example, the video signals of colors corresponding to the upper right, lower right and lower left quadrants in FIG. 3A, or the upper right, upper left and lower left quadrants in FIG. 3B, or the upper right, lower right and upper left quadrants in FIG. 3C will be influenced, so the color of the entire image will be changed.

Figure 4A:
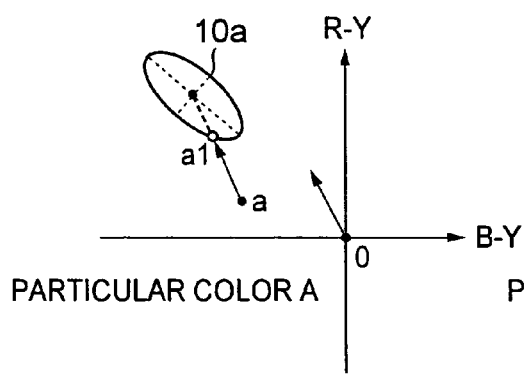
FIGS. 4A and 4B are explanatory views schematically showing the manner in which white balance is deviated due to the color correction processing by the image pickup apparatus of FIG. 1.
Figure 4B:
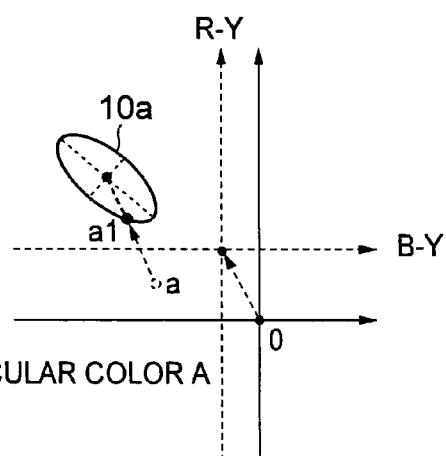

Specifically, as shown in FIG. 4A, if the position a is corrected into the position a1 where the particular color A is obtainable, the positions of colors (color difference signals) existing in the other quadrants move by the same distance, and an aftereffect of this movement amounts to the state in which the origin of the color difference plane graph is deviated by the distance from the position a to the position a1 as shown in FIG. 4B.

Namely, the fact that the origin of the color difference plane graph is deviated is that white balance for the video signals is deviated, so the color of the entire image varies to a great extent.

Accordingly, a low chroma color suppression processing is carried out to correct only the gain amount of the color difference signals [B-Y] and [R-Y] corresponding to the above-mentioned WB area, i.e., to correct only a predetermined area on the color difference plane which influences the white balance (to correct the deviation of the white balance), thereby eliminating influences on the color of the entire image.

Figure 5A:
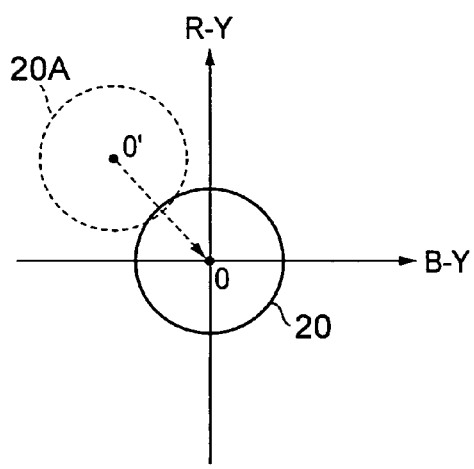
FIGS. 5A and 5B are explanatory views for explaining the manner in which the deviation of white balance is corrected by the color correction processing of FIG. 4.
Figure 5B:
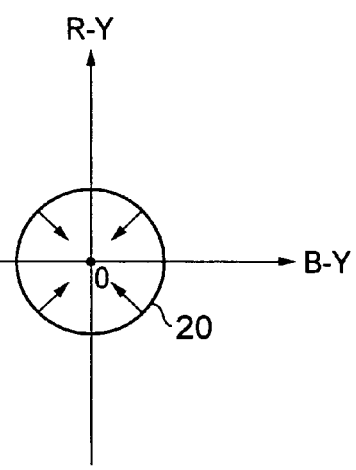

FIGS. 5A and 5B show the low chroma color suppression processing in schematic form. As shown in FIG. 5A, the gain amount of color difference signals corresponding to a WB area in the video signal are calculated so that a WB area 20A (dashed line) deviated by the correction of a particular color is corrected toward a state before the color difference correction circuit 112 performs correction, i.e., into a WB area 20 (solid line), and as shown in FIG. 5B, only a video signal corresponding to the WB area 20 is corrected on the basis of the calculated gain amount, whereby the deviation of the white balance is corrected along with the particular color being corrected.

The white balance control amount calculated by the WB control amount calculation circuit will be described below with reference to FIGS. 6A and 6B.

Figure 6A:
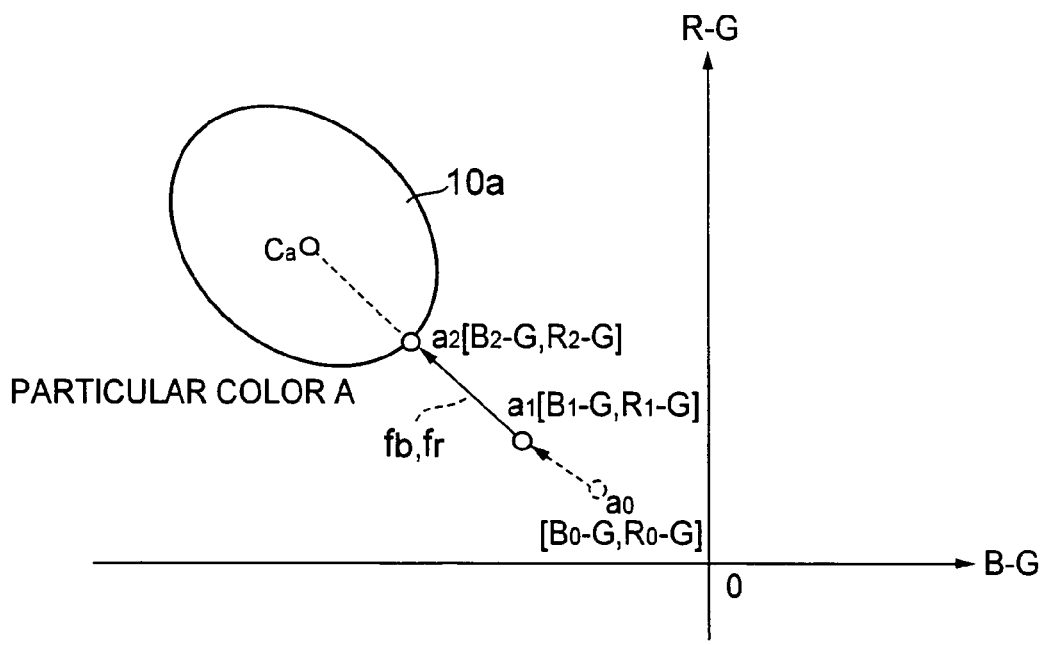
FIGS. 6A and 6B are explanatory views for explaining a white balance control amount to be calculated by an WB control amount calculation circuit of the image pickup apparatus of FIG. 1.

FIG. 6A schematically represents the manner in which the video signal of a color corresponding to coordinates [B1-G, R1-G], i.e., a position a1, is color-corrected into the particular color A of an area 10a centered at the position of a point ca, in a color difference plane graph (of two-dimensional coordinates which are represented by a vertical axis indicative of a color difference signal [R-G] and a horizontal axis indicative of a color difference signal [B-G]).

Incidentally, the color difference plane graph of FIG. 6A is based on the state in which the white balance correction function of the apparatus is ON, and the position a1 of the video signal of the color to be corrected is a position corresponding to the state where predetermined white balance is performed by the white balance correction function, which position is deviated from a position a0 (coordinates [B0-G, R0-G]) corresponding to the state where the white balance correction is not at all performed by the white balance correction function.

First, in order to find a correction position on the color difference plane, the central position ca of the area 10a of the particular color A corresponding to image taking mode information and the position a1 of the video signal of the color to be corrected are connected by a straight line, and the coordinates [B2-G, R2-G] of a position a2 at which the straight line intersects with the outermost periphery of the area 10a are calculated.

It is to be noted that the hue between the color to be corrected and the other colors is restrained from extremely varying, by color-correcting the position a1 toward not the central position ca of the area 10a of the particular color A but the coordinates [B2-G, R2-G] of the position a2 at which the straight line intersects with the outermost periphery of the area 10a.

If fr and fb denote the correction amounts necessary to correct the position a1 into the position a2, the relationship between the position a1 and the position a2 is expressed by the following equation 1.

$$f_r \cdot (R1\text{-}G) R2\text{-}G \qquad \text{Equation 1}$$

$$f_b \cdot (B1\text{-}G) B2\text{-}G \qquad \text{Equation 1}$$

Figure 6B:
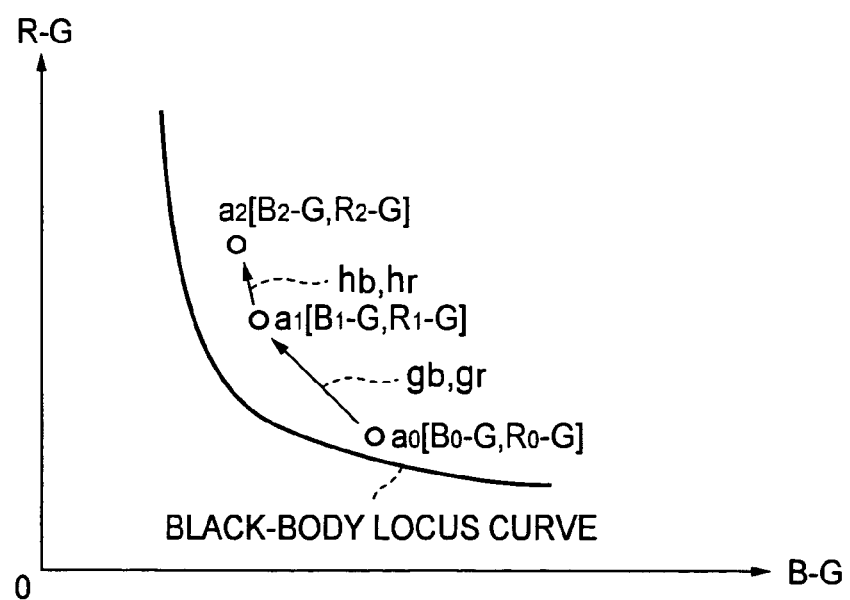

In addition, if the color difference plane graph of FIG. 6A is expressed by a ratio plane graph (of two-dimensional coordinates which are represented by a vertical axis indicative of [R-G] and a horizontal axis indicative of a color difference [B-G]), the relationship between the positions a0, a1, and a2 is as shown in FIG. 6B.

In the ratio plane graph of FIG. 6B, if hr and hb denote the correction amounts necessary to correct the position a1 into the position a2, the relationship between the position a1 and the position a2 is expressed by the following equation 2.

$$h_r \times \frac{R_1}{G} = \frac{R_2}{G} \quad \therefore \quad h_r \cdot R_1 = R_2 \qquad \text{[Equation 2]}$$

$$h_b \times \frac{B_1}{G} = \frac{B_2}{G} \quad \therefore \quad h_b \cdot B_1 = B_2$$

The correction amounts hr and hb based on the above-mentioned equation 1 and equation 2 can be expressed by the following equation 3.

$$h_r = \frac{R_2}{R_1} = \frac{f_r \cdot (R_1 - G) + G}{R_1} \qquad \text{[Equation 3]}$$

$$h_b = \frac{B_2}{B_1} = \frac{f_b \cdot (B_1 - G) + G}{B_1}$$

If the white balance correction function is turned on, the video signal at the position a0 (the coordinates [B0-G, R0-G]) corresponding to the state where white balance correction is not at all performed is corrected into the one at the position a1 (the coordinates [B1-G, R1-G]) in the ratio plane graph of FIG. 6B. If gr and gb denote the correction amounts necessary at this time, the relationship between the position a0 and the position a1 is expressed by the following equation 4.

$$g_r \times \frac{R_0}{G} = \frac{R_1}{G} \quad \therefore \quad g_r \cdot R_0 = R_1 \qquad \text{[Equation 4]}$$

$$g_b \times \frac{B_0}{G} = \frac{B_1}{G} \quad \therefore \quad g_b \cdot B_0 = B_1$$

Then, the following equation 5 is derived from the above-mentioned equation 2 and equation 4.

$$h_r \cdot g_r \cdot R_0 = R_2 \qquad \text{Equation 5}$$

$$h_b \cdot g_b \cdot B_0 = B_2 \qquad \text{Equation 5}$$

In Equation 5, "hr·gr" and "hr·gb" are the control amounts necessary to correct the position a0 into the position a2, and if these respective control amounts are set as white balance control amounts gr' and gb' and the correction amounts hr and hb of Equation 3 are respectively substituted for "hr"

and "hb", the white balance control amounts gr' and gb' can be expressed by the following equation 6.

$$g'_r = h_r \cdot g_r$$
$$= \frac{f_r \cdot (R_1 - G) + G}{R_1} \cdot g_r$$
$$g'_b = h_b \cdot g_b$$
$$= \frac{f_b \cdot (B_1 - G) + G}{B_1} \cdot g_b$$

[Equation 6]

Incidentally, the correction amounts gr and gb are correction amounts of automatic white balance for correcting the position a0 into the positional, i.e., correction amounts which are automatically set by the white balance correction function of the apparatus.

The WB control amount calculation circuit 107 calculates the white balance control amounts gr' and gb' on the basis of Equation 6, and transmits the white balance control amounts gr' and gb' to the WB circuit 108. The WB circuit 108 corrects, in accordance with the white balance control amounts gr' and gb', the white balance of the video signal so that the particular color becomes an optimum color.

Now, the operation of the low chroma color suppression circuit will be described below.

As mentioned above, the color difference correction circuit 112 performs the processing of correcting a particular color of transmitted color difference signals [B-Y] and [R-Y] into a predetermined color on the basis of color correction parameter values set in the color difference correction circuit 112, but colors other than the particular color of the video signal are changed due to this correction processing; in other words, their positions on the color difference plane are deviated.

Namely, white balance is also deviated, and the color of the entire image is changed (refer to FIG. 5A). For this reason, a so-called low chroma color suppression processing is performed, which calculates the gain amount, among of the color difference signals [B-Y] and [R-Y], of color difference signals [B-Y] and [R-Y] corresponding to a WB area and corrects the color difference signals [B-Y] and [R-Y] corresponding to the WB area, according to the calculated gain amount (refer to FIG. 5B).

First of all, the low chroma color suppression processing finds a direct distance between the origin of the color difference plane graph and the color difference signals [B-Y] and [R-Y] corresponding to the WB area in order to calculate the gain amount of the color difference signals [B-Y] and [R-Y] corresponding to the WB area.

Figure 7:
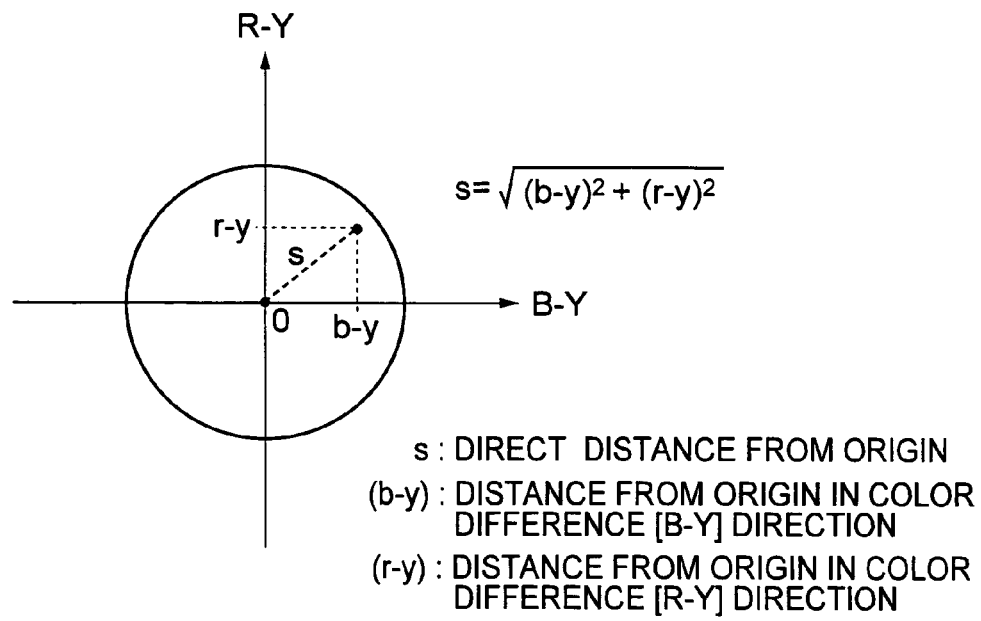
FIG. 7 is a explanatory view for explaining the operation of calculating the gain amount of color difference signals by means of a low chroma color suppression control of the image pickup apparatus of FIG. 1.

As shown in FIG. 7, if "b-y" denote a distance from the origin in the color difference [B-Y] direction in the color difference plane graph and if "r-y" denote a distance from the origin in the color difference [R-Y] direction, a direct distance "s" (hereinafter, the distance s) between the origin and the color difference signals [B-Y] and [R-Y] corresponding to the WB area is calculated by the following equation 7.

$$s = \sqrt{(b-y)^2 + (r-y)^2}$$

Equation 7

Then, the gain amount of the color difference signals [B-Y] and [R-Y] corresponding to the WB area is calculated by the following equation 8 on the basis of the calculated distance s.

$$\text{gain}(s, \gamma) = s^\gamma$$

Equation 8

In Equation 8, a reference s is a direct distance from the origin, γ is a convergence coefficient, and Gain(s, γ) is a gain amount (corrected amount).

Incidentally, the convergence coefficient γ is a coefficient value found by evaluating colors of various images, and is stored in the apparatus in advance, and serves as a coefficient value to be used when a gain amount for enabling convergence to (a position corresponding to) a predetermined color on the color difference plane is to be calculated.

Figure 8:
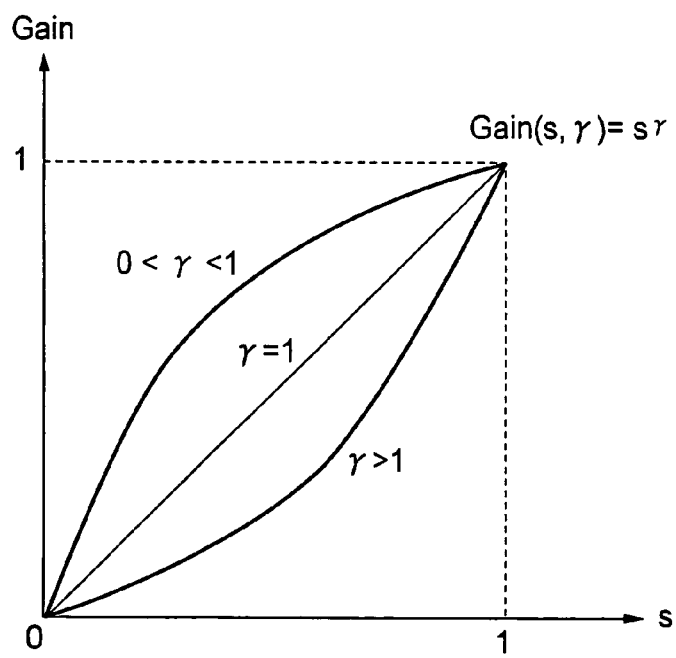
FIG. 8 is a graph showing the relationship between a direct distance s from the origin in the color difference plane graph, a conversion coefficient $\gamma$ and a gain amount Gain(s, $\gamma$)

FIG. 8 is a normalized graph in which the direct distance s from the origin (hereinafter referred to as the distance s) raised to the power of the conversion coefficient γ is associated with the gain amount Gain(s, γ) on the basis of Equation 7 and Equation 8, and the graph is divided into "0 <γ<1", "γ=1", and "γ>1" according to the value of the convergence coefficient γ.

When the gain amount is to be calculated, the convergence coefficient γ is selected according to the distance s found from Equation 7 on the basis of FIG. 8, and the gain amount Gain(s, γ) of the color difference signals [B-Y] and [R-Y] corresponding to the WB area is calculated from this convergence coefficient γ and the distances found from Equation 7.

Figure 9:
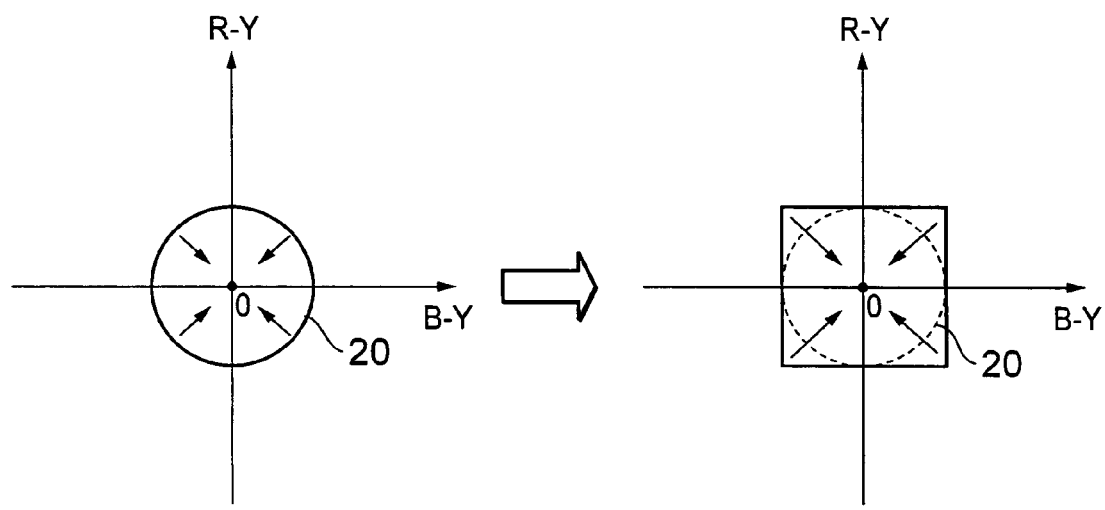
FIG. 9 is an explanatory view showing one example of the case where a correction area by the low chroma color suppression control of the image pickup apparatus of FIG. 1 is simplified.

Incidentally, in the case where the shape of the WB area 20 on the color difference plane is circular or elliptical, the amount of calculation becomes large. Accordingly, as shown in FIG. 9, the deformation rate at which a predetermined circle which serves as a reference (hereinafter referred to as a reference circle) is deformed into a rectangle is found in advance, and the distance s and the gain amount Gain(s, γ) are calculated with the shape of the WB area 20 deformed into a rectangle and the values of the calculated distance s and gain amount Gain(s, γ) are corrected according to the deformation rate, whereby the amount of calculation can be reduced and the speed of processing can also be increased.

Then, on the basis of the following equation 9, the calculated gain amount Gain(s, γ) is multiplied by the color difference signal [B-Y] and the color difference signal [R-Y] transmitted from the color difference correction circuit 112, thereby correcting (converging) the gain amount of the color difference signals corresponding to the WB area.

$$[B-Y]'' = \text{gain}(s, \gamma) \cdot [B-Y]$$
$$[R-Y]'' = \text{gain}(s, \gamma) \cdot [R-Y]$$

Equation 9

In this manner, only the color corresponding to the predetermined area centered at the origin in the color difference plane can be corrected, whereby it is possible to correct white balance deviated due to the correction of the particular color.

Figure 10:
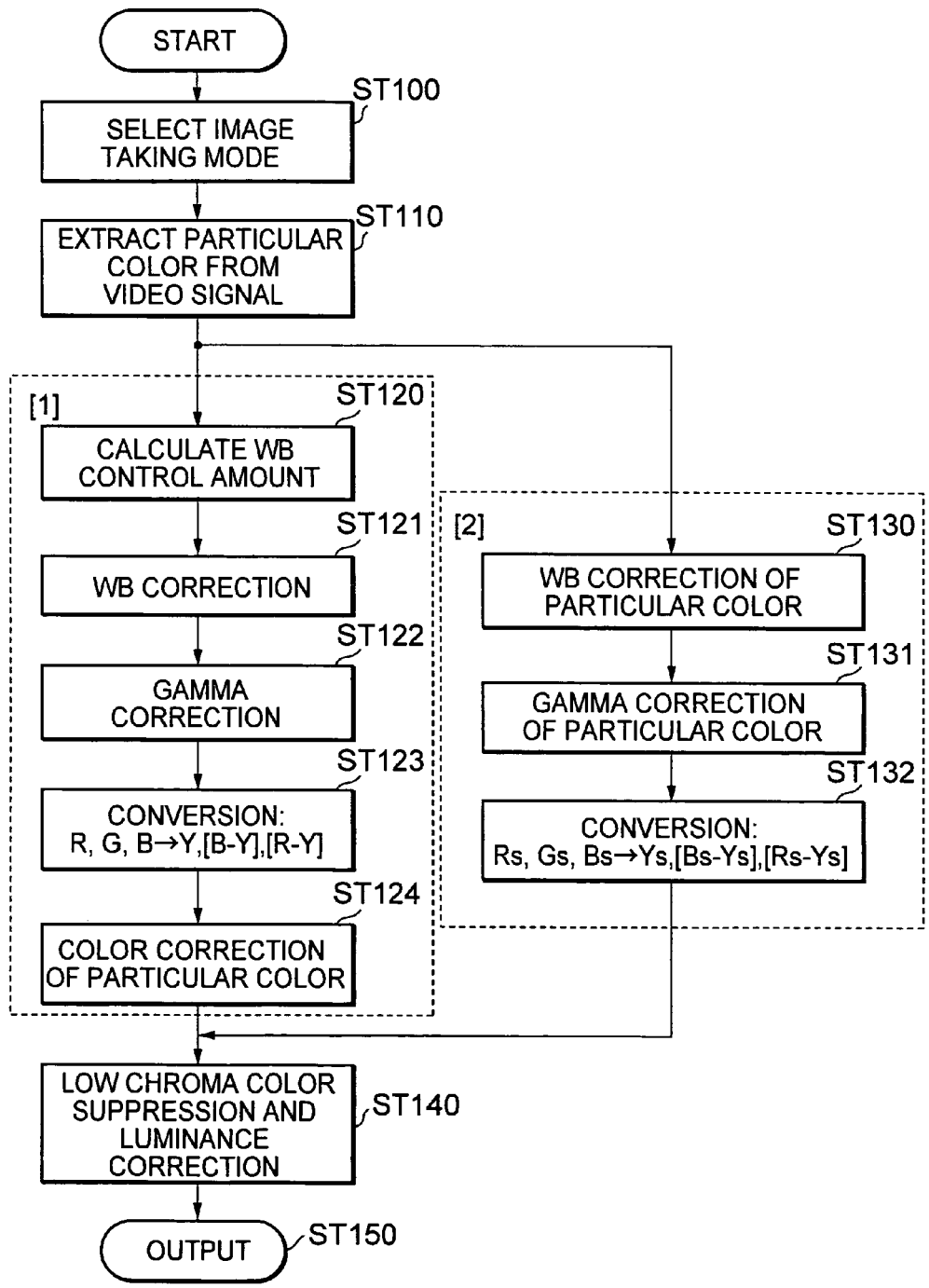
FIG. 10 is a flowchart showing an outline of the operation of color signal correction processing of the image pickup apparatus of FIG. 1.
Figure 11:
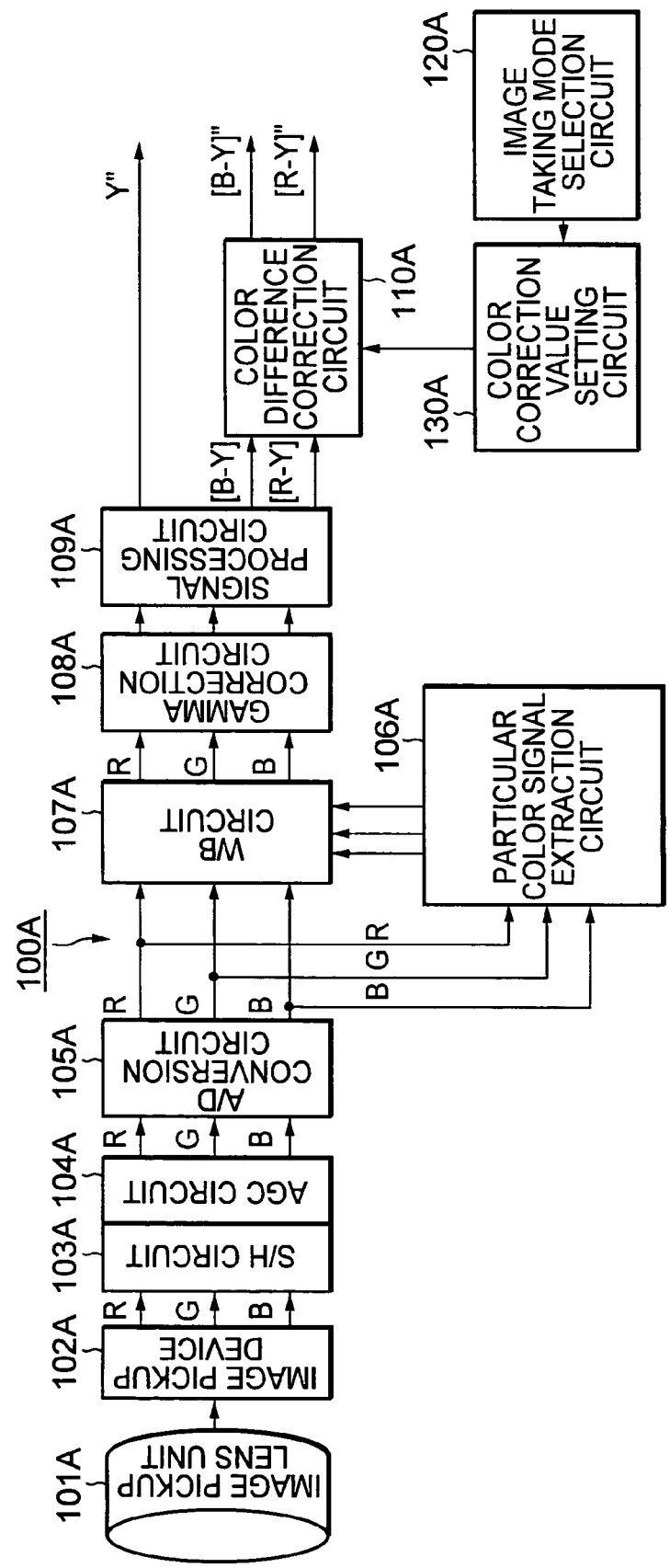
FIG. 11 is one example of a block diagram showing a schematic construction of essential units for performing color correction processing in a related-art image pickup apparatus.
Figure 12:
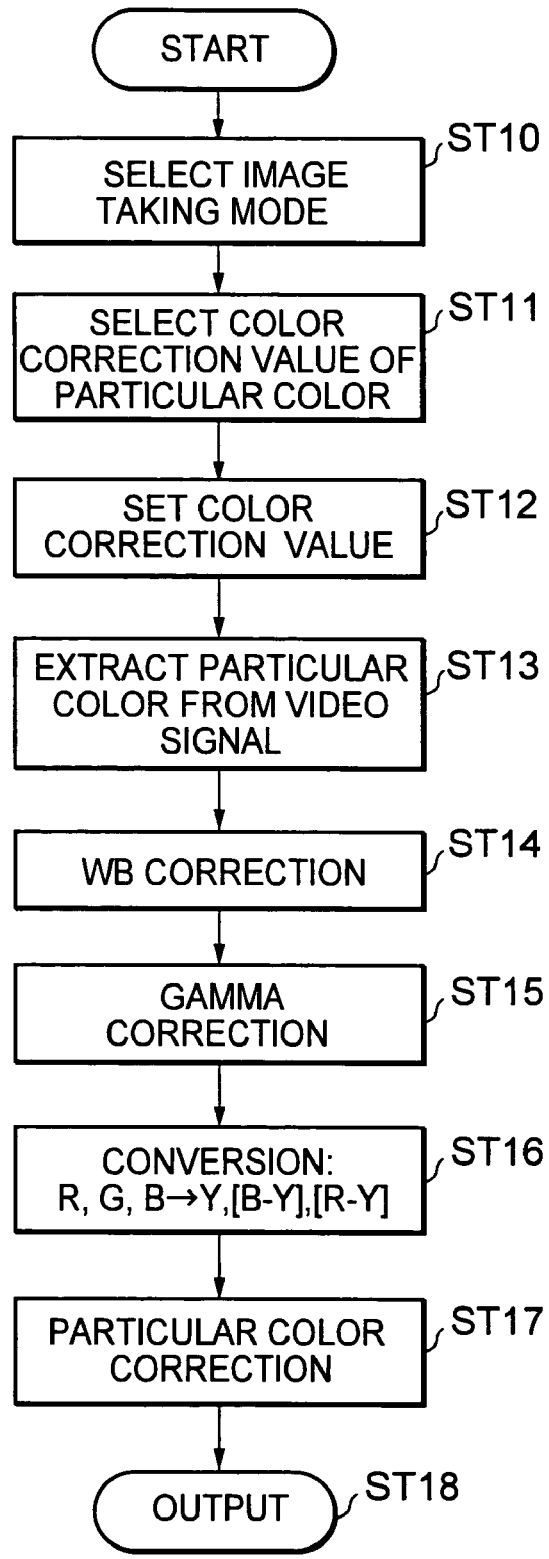
FIG. 12 is a flowchart showing an outline of the operation of color signal correction processing by the image pickup apparatus of FIG. 11.
Figures 13A, 13B, 13C, 13D:
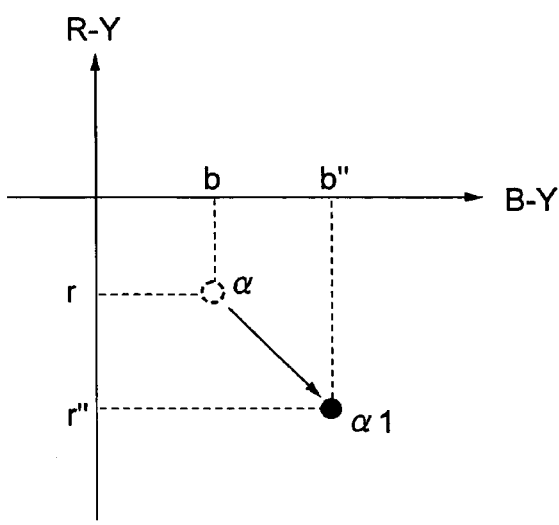
FIGS. 13A to 13D are explanatory views schematically showing the manner of color correction processing by the image pickup apparatus of FIG. 11.

The operating process of the color correction processing in the image pickup apparatus 100 having the above-mentioned construction will be described below with reference to the flowchart of FIG. 10.

First, when a camera user selects a desired image taking mode via the image taking mode selection circuit 120 or an image taking mode is automatically selected according to an image taking environment, the image taking mode information corresponding to the selected image taking mode is transmitted to various units of the apparatus such as the particular color signal extraction circuit 106, the WB control amount calculation circuit 107, the luminance correction circuit 111 and the low chroma color suppression circuit 113, and various kinds of settings such as focus and white balance can be automatically performed in step ST100.

Then, when image taking is started, light from an object which is inputted via the image pickup lens unit 101 is converted to electrical signals by the image pickup device 102, and the electrical signals are converted to a digital video signal (R[red], G[green], and B[blue]) by the A/D conversion circuit 105 through the S/H circuit 103 and the AGC circuit 104. The digital video signal (R[red], G[green], and B[blue]) is transmitted to the particular color signal extraction circuit 106 and the WB circuit 108.

The particular color signal extraction circuit 106 extracts a particular color signal (Rs[red], Gs[green], and Bs[blue]) from the video signal (R[red], G[green], and B [blue]) transmitted from the A/D conversion circuit 105, on the basis of the image taking mode information selected by the image taking mode selection circuit 120, and transmits the particular color signal (Rs[red], Gs[green], Bs[blue]) to the WB control amount calculation circuit 107 and the particular color signal processing unit 130 in step ST110.

The processing procedure of the video signal (R[red], G[green], and B[blue]) will first be described below (dotted lines [1] of FIG. 10).

The WB control amount calculation circuit 107 calculates a white balance control amount corresponding to a luminance signal Ys and color difference signals [Bs-Ys] and [Rs-Ys] from the signal processing circuit 133 of the particular color signal processing unit 130, and transmits the white balance control amount to the WB circuit 108 in ST120.

The WB circuit 108 determines the color temperature of the video signal (R[red], G[green], and B[blue]) transmitted from the A/D conversion circuit 105, and corrects the white balance of the video signal (R[red], G[green], and B[blue]) on the basis of the control amount for white balance calculated by the WB control amount calculation circuit 107, and transmits the video signal (R[red], G[green], and B[blue]) corrected for white balance to the gamma correction circuit 109 in step ST121.

The gamma correction circuit 109 corrects the gray scale (gamma correction) of the white balance corrected video signal (R[red], G[green], and B[blue]), and transmits the gamma-corrected video signal (R[red], G[green], and B[blue]) to the signal processing circuit 110 in step ST122.

The signal processing circuit 110 converts the gamma-corrected video signal (R[red], G[green], and B[blue]) to a luminance signal Y and a color difference signal [B-Y] and a color difference signal [R-Y], and transmits the converted luminance signal Y to the luminance correction circuit 111 and also transmits the converted color difference signal [B-Y] and the color difference signal [R-Y] to the color difference correction circuit 112 in step ST123.

The color difference correction circuit 112 corrects, on the basis of color correction parameter values which are set in itself, a particular color of the color difference signals [B-Y] and [R-Y] transmitted from the signal processing circuit 110 into a predetermined color, and transmits the color-corrected color difference signals [B-Y] and [R-Y] to the low chroma color suppression circuit 113 in step ST124.

The processing procedure of the particular color signal (Rs[red], Gs[green], and Bs[blue]) by the particular color signal processing unit 130 will be described below (dotted lines [2] of FIG. 10).

First, the WB circuit 131 of the particular color signal processing unit 130 determines the color temperature of the particular color signal (Rs[red], Gs[green], and Bs[blue]) extracted by the particular color signal extraction circuit 106, and corrects the white balance of the particular color signal (Rs [red], Gs [green], and Bs[blue]), and transmits the particular color signal (Rs[red], Gs[green], and Bs[blue]) corrected for white balance to the gamma correction circuit 132 in step ST130.

Then, the gamma correction circuit 132 of the particular color signal processing unit 130 corrects the gray scale (gamma correction) of the particular color signal (Rs[red], Gs[green], and Bs[blue]) corrected for white balance, and transmits the gamma-corrected particular color signal (Rs [red], Gs[green], and Bs[blue]) to the signal processing circuit 133 of the particular color signal processing unit 130 in ST131.

Then, the signal processing circuit 133 of the particular color signal processing unit 130 converts the gamma-corrected particular color signal (Rs[red], Gs[green], and Bs[blue]) to a luminance signal Ys and color difference signals [Bs-Ys] and [Rs-Ys], and transmits the luminance signal Ys to the particular color signal extraction circuit 106 and the WB control amount calculation circuit 107 and also transmits the color difference signal [Bs-Ys] and the color difference signal [Rs-Ys] to the WB control amount calculation circuit 107 and the low chroma color suppression circuit 113 in step ST132.

Subsequently following the above-mentioned processing of the video signal (R[red], G[green], and B[blue]) and the particular color signal (Rs[red], Gs[green], and Bs[blue]), processing by the luminance correction circuit 111 and the low chroma color suppression circuit 113 is carried out.

The luminance correction circuit 111 corrects the luminance level of the luminance signal Y transmitted from the signal processing circuit 110, on the basis of the image taking mode information selected by the image taking mode selection circuit 120, and outputs a luminance-corrected luminance signal Y" to the next-stage circuit in step ST140 and step ST150.

In the mean time, the low chroma color suppression circuit 113 performs low chroma color suppression control according to the color difference signal [Bs-Ys] and the color difference signal [Rs-Ys] transmitted from the signal processing circuit 133 of the particular color signal processing unit 130, on the basis of the image taking mode information selected by the image taking mode selection circuit 120, and corrects the gain amount of color difference signals [B-Y] and [R-Y] corresponding to a WB area, from among the color difference signal [B-Y] and the color difference signal [R-Y] transmitted from the color difference correction circuit 112, and transmits color difference signals [B-Y]" and [R-Y]" corrected for the deviation of white balance to the next-stage circuit in step ST140 and step ST150.

In this manner, on the basis of the image taking mode information selected by the image taking mode selection circuit 120, the particular color is corrected by the color difference correction circuit 112 and only the color difference signals [B-Y] and [R-Y] corresponding to the WB area are corrected by the low chroma color suppression circuit 113, whereby the particular color is corrected and a video signal corrected for white balance deviated due to the color correction processing is outputted.

This application claims priority from Japanese Priority Document No. 2003-318192, filed on Sep. 10, 2003 with the Japanese Patent Office, which document is hereby incorporated by reference.

What is claimed is:

1. An image pickup apparatus comprising:
image taking mode selecting means for selecting image taking mode information containing information on particular colors determined according to predetermined image taking conditions;

particular color signal extracting means for extracting a video signal of the particular color from an input video signal based on the image taking mode information selected by the image taking mode selecting means;

white balance control amount calculating means for calculating a control amount for controlling the white balance of the input video signal based on the video signal of the particular color extracted by the particular color signal extracting means;

white balance correcting means for correcting the white balance of the input video signal according to the control amount calculated by the white balance control amount calculating means;

color correcting means for correcting the particular color of the video signal corrected by the white balance correcting means into a predetermined color based on a color correction parameter value set for correcting the video signal of the particular color; and low chroma color suppression processing means for correcting a gain amount of a video signal corresponding to a predetermined area centered at the origin in a color difference plane in the video signal corrected by the color correcting means.

2. The image pickup apparatus as cited in claim 1, wherein;

when said color correcting means corrects the particular color of the video signal into the predetermined color, said color correcting means corrects the particular color into a color corresponding to the position of an intersection of the outmost periphery of the area indicating the predetermined color and a straight line which is connecting a position indicating a corresponding particular color and a central position in an area indicating the predetermined color in the color difference plane.

3. The image pickup apparatus as cited in claim 1, wherein;

said color correcting means is provided with a function for changing the color correction parameter value.

4. The image pickup apparatus as cited in claim 1; wherein;

said image taking mode selecting means is provided with a function which automatically selects the image taking mode information according to image taking environments.

5. An image pickup apparatus comprising:

image taking mode selecting means for selecting desired image taking mode information containing information on particular colors determined according to predetermined image taking conditions;

particular color signal extracting means for extracting a video signal of the particular color from an input video signal based on the image taking mode information selected by the image taking mode selecting means;

white balance control amount calculating means for calculating a control amount for controlling the white balance of the input video signal based on the video signal of the particular color extracted by the particular color signal extracting means;

white balance correcting means for correcting the white balance of the input video signal according to the control amount calculated by the white balance control amount calculating means;

color correcting means for correcting the particular color of the video signal corrected by the white balance correcting means into a predetermined color based on a color correction parameter value which is set for correcting the video signal of the particular color;

low chroma color suppression processing means for correcting a gain amount of a video signal corresponding to a predetermined area centered at the origin in a color difference plane, in the video signal corrected by the color correcting means; and luminance correcting means for correcting a luminance level of the video signal based on the image taking mode information selected by the image taking mode selecting means.

6. The image pickup apparatus as cited in claim 5, wherein said luminance correcting means is provided with a function for calculating the proportion of the video signal of the particular color in the video signal and for correcting the luminance level of the video signal of the particular color according to the calculated proportion.

7. The image pickup apparatus as cited in claim 5, wherein;

when said color correcting means corrects the particular color of the video signal into the predetermined color, said color correcting means corrects the particular color into a color corresponding to the position of an intersection of the outmost periphery of the area indicating the predetermined color and a straight line which is connecting a position indicating a corresponding particular color and a central position in an area indicating the predetermined color in the color difference plane.

8. The image pickup apparatus as cited in claim 5, wherein;

said color correcting means is provided with a function for changing the color correction parameter value.

9. The image pickup apparatus as cited in claim 5, wherein;

said image taking mode selecting means is provided with a function for automatically selecting the image taking mode information according to image taking environments.

* * * * *